US011746233B2

(12) United States Patent
Brule et al.

(10) Patent No.: US 11,746,233 B2
(45) Date of Patent: Sep. 5, 2023

(54) USE OF CIRCULAR-SECTION GLASS FIBRES IN A MIXTURE COMPRISING A SEMI-AROMATIC POLYAMIDE AND AN ALIPHATIC POLYAMIDE TO IMPROVE THE MECHANICAL PROPERTIES OF SAID MIXTURE

(71) Applicant: Arkema France, Colombes (FR)

(72) Inventors: Benoît Brule, Beaumont-le-Roger (FR); Antoine Breuil, Tokyo-to (JP); Hao Wang, Jiangsu (CN); Xiong Yao, Jiangsu (CN)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 16/342,368

(22) PCT Filed: Oct. 18, 2017

(86) PCT No.: PCT/FR2017/052867
§ 371 (c)(1),
(2) Date: Apr. 16, 2019

(87) PCT Pub. No.: WO2018/073537
PCT Pub. Date: Apr. 26, 2018

(65) Prior Publication Data
US 2019/0241739 A1    Aug. 8, 2019

(30) Foreign Application Priority Data

Oct. 19, 2016  (FR) ........................................ 1660126
Mar. 23, 2017  (FR) ........................................ 1752407

(51) Int. Cl.
C08L 77/06          (2006.01)
C08K 7/14           (2006.01)
C08L 77/02          (2006.01)

(52) U.S. Cl.
CPC ................ C08L 77/06 (2013.01); C08K 7/14 (2013.01); C08L 77/02 (2013.01); C08L 2203/20 (2013.01); C08L 2205/025 (2013.01)

(58) Field of Classification Search
CPC ...... C08L 77/06; C08L 77/02; C08L 2203/20; C08L 2205/025; C08L 77/00–10; C08K 7/14
USPC ........................................................ 524/494
See application file for complete search history.

(56) References Cited

U.S. PATENT DOCUMENTS

| 4,822,846 | A | 4/1989 | Nomura et al. |
| 9,096,714 | B2* | 8/2015 | Mitadera ............. C08G 69/265 |
| 2010/0279111 | A1 | 11/2010 | Philipp et al. |
| 2011/0105655 | A1 | 5/2011 | Harder et al. |
| 2012/0083558 | A1 | 4/2012 | Bayer et al. |
| 2013/0261256 | A1* | 10/2013 | Ieda .......................... C08G 69/08 524/607 |
| 2014/0066561 | A1 | 3/2014 | Pfleghar et al. |
| 2014/0342145 | A1 | 11/2014 | Oguro et al. |
| 2015/0080516 | A1 | 3/2015 | Kumazawa et al. |
| 2016/0122510 | A1 | 5/2016 | Verfaillie et al. |
| 2016/0130439 | A1 | 5/2016 | Koch et al. |

FOREIGN PATENT DOCUMENTS

| CN | 102459444 A | 5/2012 |
| CN | 103987782 A | 8/2014 |
| EP | 1972659 A1 | 9/2008 |
| EP | 2789591 A1 | 10/2014 |
| EP | 2792714 A1 | 10/2014 |
| JP | S63-137956 A | 6/1988 |
| JP | 2007-302866 A | 11/2007 |
| JP | 2010-168559 A | 8/2010 |
| JP | 2011102360 A * | 5/2011 |
| JP | 2014-043577 A | 3/2014 |
| JP | 5523520 B2 | 4/2014 |
| JP | 2016-108547 A | 6/2016 |
| JP | 2010-189467 A | 7/2016 |
| JP | 2016-521777 A | 7/2016 |
| KR | 10 2014 0107445 A | 9/2014 |
| WO | 2013/088932 A1 | 6/2013 |
| WO | 2014195226 A1 | 12/2014 |

OTHER PUBLICATIONS

JP 2011-102360 A, machine translation, EPO espacenet. (Year: 2011).*
International Search Report (PCT/ISA/210) dated Feb. 21, 2018, by the European Patent Office as the International Searching Authority for International Application No. PCT/FR2017/052866.
International Search Report (PCT/ISA/210) dated Mar. 7, 2018, by the European Patent Office as the International Searching Authority for International Application No. PCT/FR2017/052867.
Written Opinion (PCT/ISA/237) dated Feb. 21, 2018, by the European Patent Office as the International Searching Authority for International Application No. PCT/FR2017/052866.

(Continued)

Primary Examiner — Wenwen Cai
(74) Attorney, Agent, or Firm — Boone IP Law

(57) ABSTRACT

The use of circular-section glass fibres in a mixture including at least one MXDZ polyamide, obtained from polycondensation of meta-xylylenediamine (MXD), with a $C_6$ to $C_{18}$ aliphatic (Z) dicarboxylic acid, and at least one aliphatic polyamide A obtained from the polycondensation of a unit selected from: a $C_6$ to $C_{12}$ lactam, a $C_6$ to $C_{12}$ amino acid, and an XY unit obtained from the polycondensation of a $C_4$ to $C_{18}$ aliphatic diamine (X), and a $C_6$ to $C_{18}$ aliphatic dicarboxylic acid (Y), circular-section glass fibres and optionally at least one impact modifier and/or at least one additive, said circular-section glass fibres and said mixture constituting a composition, said circular-section glass fibres being present from 30 to 75% by weight and with respect to the total weight of the composition, to improve the mechanical properties of said composition, including elongation at break, after processing, in particular by injection or compression moulding.

10 Claims, 1 Drawing Sheet

(56) References Cited

OTHER PUBLICATIONS

Written Opinion (PCT/ISA/237) dated Mar. 7, 2018, by the European Patent Office as the International Searching Authority for International Application No. PCT/FR2017/052867.
Wallenberger, Frederick T., et al., Glass Fibers, ASM International, ASM Handbook, vol. 21: Composites (#06781G), pp. 27-34, 2001.
Office Action (The First Office Action) dated Jun. 7, 2021 by the China National Intellectual Property Administration in corresponding Chinese Patent Application No. 201780064424.6, and an English Translation of the Office Action. (13 pages).
Office Action (Notice of Grounds for Rejection) dated Dec. 15, 2021, by the Intellectual Property Office in corresponding Korean Patent Application No. 10-2019-7013967, and an English Translation of the Office Action. (9 pages).
Office Action (Notice of Reasons for Rejection) dated Oct. 26, 2021, by the Japanese Patent Office in corresponding Japanese Patent Application No. 2019-520728, and an English Translation of the Office Action. (10 pages).

\* cited by examiner

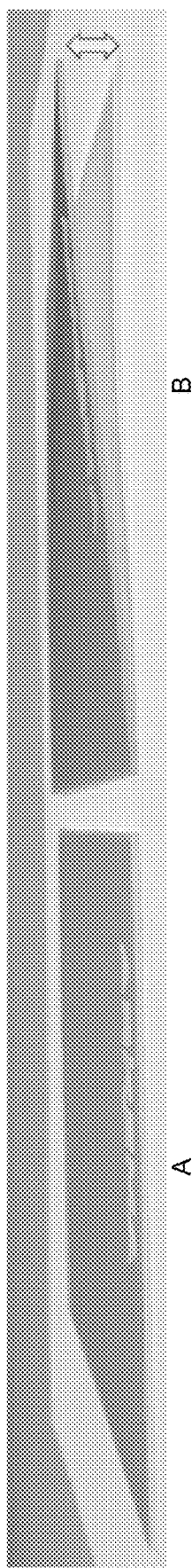

USE OF CIRCULAR-SECTION GLASS FIBRES IN A MIXTURE COMPRISING A SEMI-AROMATIC POLYAMIDE AND AN ALIPHATIC POLYAMIDE TO IMPROVE THE MECHANICAL PROPERTIES OF SAID MIXTURE

The present invention relates to the use of circular-section glass fibres in a mixture comprising at least one MXDZ polyamide and at least one aliphatic polyamide, in particular semicrystalline, to improve the mechanical properties of said composition, including elongation at break, after processing, especially by injection or compression moulding.

It also relates to the composition obtained with the semi-aromatic polyamide and the aliphatic polyamide mixture comprising circular-section glass fibres and its use in constituting a monolayer structure or at least one layer of a multilayer structure, especially in the electrical and/or electronics (E/E) field (s).

Many applications in the E/E field require very rigid materials (phone shell, computer part . . . ). Rigidity is even more important as the market trend moves towards a decrease in the weight of electronic equipment and therefore towards a reduction in the thickness of parts.

However, the production of thin parts leads to other issues: ability to be injected, namely materials sufficiently fluid to completely fill the mould and especially said parts the thickness of which is reduced, must have sufficient mechanical properties, especially elongation at break, after processing, in particular by injection or compression moulding to withstand loads during the product service life.

In these applications, rigid polyamides (PA) (modulus>12 GPa) play a vital role. However, when the fibre content is greater than 30%, the use of non-circular or flat (FF) cross-section fibres is the solution chosen to meet all the specifications, especially warping and mechanical properties.

Thus, patent application EP2789591 [0003] indicates that the non-circular cross-section glass fibres make it possible to improve the mechanical properties, dimensional accuracy and warping of resins reinforced with said non-circular-section glass fibres. This is due, according to this application, with regard to the improvement of mechanical properties, to the fact that non-circular-section glass fibres have a greater contact area than circular-section fibres.

Patent application US 2011/0105655 describes compositions having a low distortion rate during moulding and consisting of 25 to 72% by weight of a polyamide, 20 to 65% by weight of flat-section glass fibres with L/D ratio of 2 to 8, and 8 to 25% of a flame retardant (L representing the large dimension of the cross section of the fibre and D the small dimension of the cross section of said fibre). The polyamide used is a mixture of 55-90% by weight of an aliphatic polyamide and 10 to 45% by weight of another polyamide selected from MACM10-18, MACMI, MACMT, MXDI, MXDT, MXDX/MXDI, PACM10-18, 6I, 6T, 6I/6T and 6T/66 with respect to the total sum of the polyamides. The elongation at break values presented in the examples of this application range from 1.3 to 1.5% for mixtures of PAXY (PA66) and PA6 or PA6I/6T (MXDZ is not exemplified) comprising glass fibre, regardless of the shape of the fibres, flat or circular-section. In addition, the use of flat-section glass fibres always leads to an elongation at break greater than that obtained with circular-section glass fibres.

Patent number JP5523520 describes polyamide granules having electrical properties and resistance to deformation. The granules consist of 5-40 parts by weight of a flame retardant, 5-200 parts by weight of a flat-section glass fibre with an L/D ratio of at least 2.3 and 0-40 parts by weight of a polyamide which may be a mixture of aliphatic polyamide with a semi-aromatic polyamide such as MXD10.

However, these different compositions of the prior art and especially with flat-section glass fibres lead to compositions having mechanical properties that may be insufficient for an E/E application.

Furthermore, the use of flat-section glass fibres compared to circular-section glass fibres generates a significant additional cost. In addition, flat-section glass fibre suppliers are much fewer than circular-section glass fibre suppliers. Both aspects are essential in the context of the industrial production of glass fibre reinforced resins.

It is therefore necessary to have compositions using circular-section glass fibres, thus making it possible to limit the cost of said composition and to ensure a long-lasting supply of circular-section glass fibres and to have compositions with improved mechanical properties including elongation at break, after processing, especially by injection or compression moulding, compared to flat-section glass fibres.

These various problems have been solved with the use of circular-section glass fibres with a specific mixture based on aliphatic polyamide and MXDZ.

The inventors have in fact unexpectedly found that the addition of circular-section glass fibres in a mixture comprising at least one MXDZ polyamide and at least one aliphatic polyamide, in particular semi-crystalline polyamide, improves the mechanical properties of said composition, especially elongation at break, after processing, especially by injection or compression moulding compared to the same composition comprising flat-section glass fibres instead of circular-section glass fibres.

Another advantage of the invention is that said compositions exhibit limited warping during implementation, especially by injection or compression moulding of the composition, meaning a warping less than 2 mm, in particular less than 1 mm as determined on 100*100*1 $mm^3$ plates.

Warping can be totally removed, but as a rule, it is less than 2 mm, especially less than 1 mm.

The present invention relates to the use of circular-section glass fibres in a mixture comprising at least one MXDZ polyamide, obtained from the polycondensation of meta-xylylenediamine (MXD), with a $C_6$ to $C_{18}$, in particular $C_6$ to $C_{12}$ aliphatic (Z) dicarboxylic acid, and at least one aliphatic polyamide A obtained from the polycondensation of a unit selected from:
- a $C_6$ to $C_{12}$ lactam,
- a $C_6$ to $C_{12}$ amino acid, and
- an XY unit obtained from the polycondensation of a $C_4$ to $C_{18}$, in particular $C_4$ to $C_{12}$ aliphatic diamine (X), and a $C_6$ to $C_{18}$, in particular $C_6$ to $C_{12}$ aliphatic dicarboxylic acid (Y), circular-section glass fibres and optionally at least one impact modifier and/or at least one additive, said circular-section glass fibres and said mixture constituting a composition,
said circular-section glass fibres being present from 30 to 75% by weight, in particular from 40 to 65% by weight and with respect to the total weight of the composition,
to improve the mechanical properties of said composition, including elongation at break, after processing, in particular by injection or compression moulding.

Meta-xylylenediamine (MXD, CAS No. 1477-55-0) can be used alone or in combination with para-xylylenediamine (PXD, CAS No. 539-48-0) which corresponds to an isomer of. But in the latter case, and in all the description, the quantity of MXD must be higher compared to PXD.

Advantageously, MXD is used alone and the composition is therefore devoid of PXD. $C_6$ to $C_{18}$ aliphatic dicarboxylic acid (Z) may be selected from adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid.

Advantageously, aliphatic dicarboxylic acid (Z) is $C_7$ to $C_{18}$ and may be selected from suberic acid, azelaic acid, sebacic acid, undecanedioic acid, dodecanedioic acid, brassylic acid, tetradecanedioic acid, pentadecanedioic acid, hexadecanedioic acid, octadecanedioic acid.

Aliphatic dicarboxylic acid (Z) is not a mixture of the above-defined $C_6$ to $C_{18}$, or $C_7$ to $C_{18}$ aliphatic dicarboxylic acids, and MXDZ therefore corresponds to a homopolyamide. However, MXDZ can be a mixture of MXDZ.

In the event where MXD is mixed with PXD, then MXDZ corresponds to a MXDZ/PXDZ copolyamide provided that the MXDZ molar ratio in the copolyamide is greater than that of PXDZ.

Advantageously, the MXD is devoid of PXD and MXDZ is a homopolyamide.

Advantageously, $C_6$ to $C_{12}$ aliphatic dicarboxylic acid (Z) may be selected from adipic acid, suberic acid, azelaic acid, sebacic acid, undecanedioic acid or dodecanedioic acid.

More advantageously, the $C_7$ to $C_{12}$ aliphatic dicarboxylic acid (Z) may be selected from suberic acid, azelaic acid, sebacic acid, undecanedioic acid or dodecanedioic acid.

The term "aliphatic polyamide" refers to a homopolyamide, with the exception of a copolyamide. It is understood that it may be a mixture of aliphatic polyamides. Aliphatic polyamide A is therefore, a homopolyamide.

The nomenclature used to define polyamides is described in ISO 1874-1:2011 "Plastics—Polyamide (PA) Materials for Moulding and Extrusion—Part 1: Designation", especially on page 3 (Tables 1 and 2) and is well known to the person skilled in the art. When aliphatic polyamide A is obtained from the polycondensation of a lactam, said lactam may be selected from pyrrolidinone, 2-piperidinone, caprolactam, enantholactam, caprolactam, pelargolactam, decanolactam, undecanolactam, and lauryl lactam, especially lauryl lactam.

When aliphatic polyamide A is obtained from the polycondensation of an amino acid, it may be selected from 9-aminononanoic acid, 10-aminodecanoic acid, 10-aminoundecanoic acid, 12-aminododecanoic acid and 11-aminoundecanoic acid and its derivatives, especially N-heptyl-11-aminoundecanoic acid, in particular 11-aminoundecanoic acid.

When aliphatic polyamide A is obtained from the polycondensation of an XY unit, the $C_4$ to $C_{18}$ diamine (X) used in the XY polyamide is a linear or branched diamine, and may in particular be selected from 1,4-butanediamine, 1,5-pentanediamine, 2-methyl-1,5-pentanediamine, 1,6-hexamethylenediamine, 1,7-heptanediamine, 1,8-octanediamine, 1,9-nonanediamine, 2-methyl-1,8-octanediamine, 2,2,4-trimethylhexamethylenediamine, 2,4,4-trimethylhexamethylenediamine, 1,10-decanediamine, 1,11-undecanediamine, 2-butyl-2-ethyl-1,5-pentanediamine, 1,12-dodecanediamine, 1,13-tridecanediamine, 1,14-tetradecanediamine, 1,16-hexadecanediamine and 1,18-octadecanediamine.

Advantageously, the diamine (X) used is $C_4$ to $C_{12}$, in particular selected from 1,4-butanediamine, 1,5-pentamethyldiamine, 2-methyl-1,5-pentanediamine, 1,6-hexamethylenediamine, 1,7-heptanediamine and 1,8-octanediamine, 1,9-nonanediamine, 2-methyl-1,8-octanediamine, 2,2,4-trimethylhexamethylenediamine, 2,4,4-trimethylhexamethylenediamine, 1,10-decanediamine, 1,11-undecanediamine, 2-butyl-2-ethyl-1,5-pentanediamine, 1,12-dodecanediamine.

Advantageously, the diamine (X) used is $C_6$ to $C_{10}$, in particular selected from 2-methyl-1,5-pentanediamine, 1,6-hexamethylenediamine, 1,7-heptanediamine, 1,8-octanediamine, 1,9-nonanediamine, 2-methyl-1,8-octanediamine, 2,2,4-trimethylhexamethylenediamine, 2,4,4-trimethylhexamethylenediamine, 1,10-decanediamine.

When aliphatic polyamide A is obtained from the polycondensation of an XY unit, the $C_6$ to $C_{18}$, in particular $C_6$ to $C_{12}$ aliphatic dicarboxylic acid (Y) used in the polyamide XY is as defined above.

For the purposes of the invention, glass fibre refers to any glass fibre, especially as described by Frederick T. Wallenberger, James C. Watson and Hong Li, PPG Industries Inc. (ASM Handbook, Vol 21: composites (#06781G), 2001 ASM International), provided said fibre is circular-section.

Advantageously, said glass fibres have a diameter from 4 µm to below 25 µm, preferably from 4 to 15 microns and an L/D ratio (L representing the large dimension of the transverse section of the fibre and D the small dimension of the transverse section of said fibre) below 2, in particular below 1.5.

Advantageously, the L/D ratio is equal to about 1.

The term "impact modifier" is understood to mean a polyolefin-based polymer having a flexural modulus of less than 100 MPa measured at 23° C. according to ISO 178: 2010 and Tg of less than 0° C. (measured according to US Pat. standard 11357-2 at the inflection point of the DSC thermogram), especially a polyolefin, coupled or not with a Peba (polyether block amide) with a flexural modulus <200 MPa. Using a Peba alone as impact modifier in the composition, would not be outside the scope of the invention. The impact modifier polyolefin may be functionalised or non-functionalised or a mixture of at least one functionalised and/or at least one non-functionalised.

In particular, some or all of the polyolefins bear a function selected from carboxylic acid, carboxylic anhydride and epoxide functions, and is especially selected from an elastomeric ethylene-propylene rubber copolymer (EPR), an elastomeric ethylene-propylene-diene copolymer (EPDM) and an ethylene/alkyl (meth) acrylate copolymer, a higher ethylene-alkene copolymer, in particular, an ethylene-octene copolymer, an ethylene-alkyl acrylate-maleic anhydride terpolymer.

Advantageously, the impact modifier is selected from F493®, a Pebax®, in particular Pebax® 40R53 SP 01, a Lotader®, in particular Lotader® 5500 or Lotader® 7500, Exxelor VA1803®, or a mixture of these. In this case they are in a ratio ranging from 0.1/99.9 to 99.9/0.1, preferably 1/2 to 2/1 when in a mixture of two.

The impact modifier for example, is selected from the following mixtures: F493®/Lotader®, especially F493®/Lotader® 5500 or F493®/Lotader® 7500.

The impact modifier can also be a "core-shell" modifier, also referred to as a "core-shell copolymer".

The "core-shell" type modifier is in the form of fine particles having an elastomer core and at least one thermoplastic shell, the size of the particles is generally below 1 µm and advantageously from 150 to 500 nm.

The "core-shell" type modifier has an acrylic or butadiene base, contrary to the impact modifier which has a polyolefin base.

Advantageously, the proportion of impact modifier is from 0 to 10% by weight with respect to the total weight of the composition.

The use of circular-section glass fibres in the mixture comprising at least one MXDZ and at least one aliphatic polyamide constitutes a composition.

Advantageously, said composition is devoid of flame retardant.

Advantageously, the said composition is devoid of PA66.

Advantageously, said composition is devoid of flame retardant and PA66.

Advantageously, said composition is devoid of flame retardant, PA 6 and PA66.

The additives optionally used in the composition obtained with the use of glass fibres in a mixture of MXDZ and aliphatic polyamide A are the conventional additives used in polyamides and well known to the person skilled in the art.

The expression "improve the mechanical properties of said composition, especially elongation at break" means to withstand sufficient deformation during application.

Advantageously, the MXDZ/A weight ratio in said composition ranges from 0.11 to 0.83, in particular from 0.11 to 0.66.

Therefore, in this embodiment, the semi-aromatic polyamide MXDZ is always in a lower proportion than aliphatic polyamide A or the mixture of aliphatic polyamides A.

Advantageously, aliphatic polyamide A is a semi-crystalline polyamide or a mixture of semi crystalline polyamides.

Advantageously, the aliphatic polyamide A is a semi-crystalline polyamide.

The expression "semi-crystalline polyamide" within the scope of the invention denotes polyamides having a melting temperature (Tf) and a heat-exchange of $\Delta H > 10$ J/g, in particular $> 12$ J/g, as well as a glass transition temperature (Tg) as determined by DSC according to ISO 11357-1: 2009 and ISO 11357-2 and 3: 2013, at a heating rate of 20K/min.

Advantageously, the elongation at break of said composition after processing, in particular by injection or compression moulding, is increased by up to 30% with respect to the same composition comprising flat-section glass fibres instead of circular-section glass fibres.

In particular, said increase in said elongation at break is between 10 and 30%.

Advantageously, said composition constituted by the use of said circular-section glass fibres with said mixture comprises:

- from 5 to 30% by weight, in particular from 5 to 20% by weight of MXDZ,
- from 20 to 60% by weight, in particular from 25 to 50% by weight of said at least one polyamide A,
- from 30 to 75% by weight, in particular from 40 to 65% by weight of circular-section glass fibres,
- from 0 to 10% of at least one impact modifier,
- from 0 to 2% of at least one additive.

The sum of the proportions of each constituent of the composition being equal to 100%.

Advantageously, said composition constituted above is one of the following (the percentages are indicated by weight):

| COMPOSITION No | MXDZ | Aliphatic polyamide A | Glass fibres |
| --- | --- | --- | --- |
| 1 | 5-30% | 20-60% | 30-75% |
| 2 | 5-30% | 20-60% | 40-65% |
| 3 | 5-30% | 25-50% | 30-75% |
| 4 | 5-30% | 25-50% | 40-65% |

-continued

| COMPOSITION No | MXDZ | Aliphatic polyamide A | Glass fibres |
| --- | --- | --- | --- |
| 5 | 5-20% | 20-60% | 30-75% |
| 6 | 5-20% | 20-60% | 40-65% |
| 7 | 5-20% | 25-50% | 30-75% |
| 8 | 5-20% | 25-50% | 40-65% |

The sum of the constituents of each composition 1 to 8 is equal to 100%.

Each of the above compositions 1 to 8 may further comprise at least one impact modifier up to 10% by weight, the sum of the constituents being equal to 100%.

Each of the above compositions 1 to 8 may further comprise at least one additive up to 2% by weight, the sum of the constituents being equal to 100%.

Each of the compositions 1 to 8 above may further comprise at least one impact modifier up to 10% by weight and at least one additive up to 2% by weight, the sum of the constituents being equal to 100%.

Advantageously, the MXDZ used in one of the above-defined compositions comprises MXD10.

The MXD10 is therefore in combination with at least one other MXDZ, Z being a $C_6$ to $C_{18}$ C-dicarboxylic acid, especially $C_7$ to $C_{18}$, as defined above, in particular in a proportion greater than 50% by weight with respect to the total sum of MXDZ polyamides.

Advantageously, the MXDZ used in one of the above-defined compositions comprises MXD10 and MXD6.

Advantageously, the MXDZ used in one of the above-defined compositions consists of MXD10.

Advantageously, the aliphatic polyamide A comprises an aliphatic polyamide obtained from the polycondensation of an XY unit wherein the dicarboxylic acid (Y) is sebacic acid.

Advantageously, said aliphatic polyamide A obtained from the poly-condensation of an XY unit the dicarboxylic acid (Y) of which is sebacic acid is in a proportion greater than 50% by weight with respect to the total weight of the aliphatic polyamides A.

Advantageously, said aliphatic polyamide A obtained from the poly-condensation of an XY unit corresponds to a single polyamide the dicarboxylic acid (Y) of which is sebacic acid.

Advantageously, aliphatic polyamide A comprises an aliphatic polyamide obtained from the polycondensation of an XY unit the diamine (X) of which ranges from $C_6$ to $C_{10}$.

The aliphatic polyamide A is therefore a mixture of at least two XY polyamides the diamine (X) of which ranges from $C_6$ to $C_{10}$ the diamines being mostly different from each other.

Advantageously, said aliphatic polyamide A obtained from the polycondensation of an XY unit the diamine (X) of which ranges from $C_6$ to $C_{10}$ is in a proportion greater than 50% by weight with respect to the total weight of XY polyamides.

Advantageously, said aliphatic polyamide A obtained from the polycondensation of an XY unit consists of an XY polyamide the diamine (X) of which is from $C_6$ to $C_{10}$.

In particular, diamine (X) is selected from hexamethylenediamine and decanediamine. Advantageously, said at least MXDZ consists of 0% to 49% weight of MXD6 and 51 to 100% by weight of MXD10 and said aliphatic polyamide A obtained from the poly-condensation of an XY unit consists of 0 to 49% by weight of PA610 and 51 to 100% by weight of PA1010.

Advantageously, MXDZ consists of MXD10 and said aliphatic polyamide A obtained from the poly-condensation of an XY unit consists of 0 to 49% by weight of PA610 and 51 to 100% by weight of PA1010.

Advantageously, MXDZ consists of MXD10 and said aliphatic polyamide A obtained from the polycondensation of an XY unit consists of PA1010.

Advantageously, said at least MXDZ consists of 0% to 49% by weight of MXD6 and 51 to 100% by weight of MXD10 and said aliphatic polyamide A obtained from the polycondensation of an XY unit consists of 0 to 49% by weight of PA1010 and 51 to 100% by weight of PA610.

Advantageously, MXDZ consists of MXD10 and said aliphatic polyamide A obtained from the polycondensation of an XY unit consists of 0 to 49% by weight of PA1010 and 51 to 100% by weight of PA610.

Advantageously, MXDZ consists of MXD10 and said aliphatic polyamide A obtained from the polycondensation of an XY unit consists of PA610.

Advantageously, said aliphatic polyamide A is obtained from the polycondensation of a lactam or an amino acid, especially lauryl lactam or aminoundecanoic acid.

Advantageously, MXDZ consists of MXD10 and said aliphatic polyamide A is obtained from the polycondensation of lauryl lactam.

Advantageously, MXDZ consists of MXD10 and said aliphatic polyamide A is obtained from the polycondensation of 11-aminoundecanoic acid.

In an advantageous embodiment, said at least one additive of said composition constituted by the use of said circular-section glass fibres with said mixture is selected from fillers, dyes, stabilizers, plasticizers, surfactants, nucleating agents, pigments, brighteners, antioxidants, lubricants, flame retardants, natural waxes and mixtures thereof.

In an advantageous embodiment, said composition constituted by the use of said circular-section glass fibres with said mixture comprises:
- from 5 to 30% by weight, especially from 5 to 20% by weight, of an MXD10 polyamide obtained from the polycondensation of meta-xylylenediamine (MXD) or a mixture of meta-xylylene diamine and of para-xylylene diamine, with sebacic acid,
- from 20 to 60% by weight, especially from 25 to 50% of PA1010 obtained from the polycondensation of decanediamine and sebacic acid,
- from 30 to 75% by weight, in particular from 40 to 65% by weight of circular-section glass fibres,
- from 0 to 10% by weight of at least one impact modifier,
- from 0 to 2% by weight of at least one additive.

In an advantageous embodiment, said composition constituted by the use of said circular-section glass fibres with said mixture comprises:
- from 5 to 30% by weight, especially from 5 to 20% by weight, of an MXD10 polyamide obtained from the polycondensation of meta-xylylenediamine (MXD) or a mixture of meta-xylylene diamine and of para-xylylene diamine, with sebacic acid,
- from 20 to 60% by weight, especially from 25 to 50% of PA610 obtained from the polycondensation of hexamethylenediamine and sebacic acid,
- from 30 to 75% by weight, in particular from 40 to 65% by weight of circular-section glass fibres,
- from 0 to 10% by weight of at least one impact modifier,
- from 0 to 2% by weight of at least one additive.

Advantageously, the MXDZ of above-defined compositions 1 to 8 is MXD10 and PAXY is PA1010.

Advantageously, the MXDZ of above-defined compositions 1 to 8 is MXD10 and PAXY is PA610.

Advantageously, the MXDZ of the above-defined compositions 1 to 8 is MXD10 and aliphatic polyamide A is PA1012.

Advantageously, the MXDZ of the above-defined compositions 1 to 8 is MXD10 and aliphatic polyamide A is PA12.

Advantageously, the MXDZ of the above-defined compositions 1 to 8 is MXD10 and aliphatic polyamide A is PA11.

The above-defined composition can be used to form a monolayer structure or at least one layer of a multilayer structure.

In particular, said structure is in the form of an injected part.

The above-defined composition can also be used to constitute an object.

Said object may be shaped by a method comprising an injection moulding step of said composition.

Said object can be used in the electrical and/or electronics field.

DESCRIPTION OF FIGURES

FIGS. 1 (A and B) illustrates warping obtained with 2 plates (100*100*1 mm$^3$) injected by:
A: composition I1 or I2 of the invention,
B: composition C1 or C4,
and measured as described in example 2.
A: injected plate I1 or I2 the warping of which is limited and below 1 mm,
B: injected plate C1 or C4 the warping of which is very high and above 5 mm.

EXAMPLES

Example 1: Mechanical Properties

Synthesis

PA610, PA1010 and MXD10 were prepared separately and respectively by polycondensation of hexamethylenediamine and sebacic acid, of decanediamine and of sebacic acid and of meta-xylylenediamine and of sebacic acid according to techniques well known by the person skilled in the art.

Compounding

The compositions were prepared by melt blending of the polymer granules. The mixture was performed by compounding on a co-rotating bi-screw extruder type MC26 with a flat T profile at 270° C. The screw speed was 250 rpm.

The introduction of circular-section or flat-section glass fibres is performed by lateral force-feeding.

Injection

100*100*1 mm$^3$ plates were prepared by injection of the various compositions:
  Injection temperature (feed/nozzle): 250/270° C. and 270/300° C.
  Mould temperature: 65° C. and 90° C. and 100° C.
  Time-at-temperature: 10 seconds
  Cooling time: 20 and 30 seconds The following compositions were prepared (Table 1):

TABLE 1

| Composition | MXDZ (% by weight) | PAXY (% by weight) | Circular-section glass fibres (% by weight) Nittobo CSX3J451S0 | Flat-section glass fibres (% by weight) Nittobo CSG3PA820S |
|---|---|---|---|---|
| C1 | — | PA610 50% | 50% | — |
| C2 | — | PA610 50% | — | 50% |
| C3 | MXD10 15% | PA610 35% | — | 50% |
| I1 | MXD10 15% | PA610 35% | 50% | — |
| C4 | — | PA1010 45% | 55% | — |
| C5 | — | PA1010 45% | — | 55% |
| I2 | MXD10 15% | PA1010 30% | 55% | — |

C: Comparative composition
I: Composition of the invention

The elongation at break of compositions C2, C3 and I1 was determined according to the ISO 527 standard.

The mechanical machine is an INSTRON 5966. The crosshead speed is 1 mm/min. The test conditions are 23° C., 50% RH. ISO 527 1A geometry samples were conditioned beforehand for 2 weeks at 23° C., 50% RH. Deformation is measured by a contact extensometer.

The results are shown in table 2 (five-sample test):

TABLE 2

| Composition | Elongation at break | |
|---|---|---|
| | % | standard deviation |
| C2 | 2.7 | 0.08 |
| C3 | 2.6 | 0.07 |
| I1 | 3.6 | 0.09 |

Table 2 indicates that the composition of the invention has an elongation at break percentage increased by 30% compared to the same composition with flat-section glass fibres instead of circular-section glass fibres or a composition consisting of PA610 and flat-section glass fibres.

Example 2: Evaluation of the Warping of Polyamide Compositions Based on PA610 or PA1010, MXD10 and Circular or Flat-Section Glass Fibres Warping was evaluated according to the method described below:

The injected plates are placed on a table. The operator presses on 3 angles of the plate in order to raise the fourth. The gap between the surface of the table and the sample is then measured, see the arrow in FIG. 1. On the left sample in FIG. 1 (A), the warping is limited, meaning it is less than 1 mm.

The results are shown in Table 3 below:

TABLE 3

| Composition | Warping |
|---|---|
| C1 | Very great >5 mm* |
| C2 | <1 mm |

TABLE 3-continued

| Composition | Warping |
|---|---|
| I1 | <1 mm |
| C4 | Very great >5 mm |
| C5 | <1 mm |
| I2 | <1 mm |

*Warping is very great regardless of injection conditions (different T, different mould T, cooling temperature, . . .)
C: Comparative composition
I: Composition of the invention Table 3 illustrates that the introduction of circular-section glass fibres in an aliphatic XY polyamide devoid of MXDZ induces significant warping which is practically eliminated by the introduction of MXDZ, even for a proportion as high as 50% by weight of circular-section glass.

The invention claimed is:

1. A method for improving elongation at break of a polyamide MXDZ/A mixture, the method comprising:
   adding circular-section glass fibres to the polyamide MXDZ/A mixture to produce a fiber-reinforced mixture, and
   processing the fiber-reinforced mixture;
   wherein the polyamide MXDZ/A mixture comprises:
   at least one MXDZ polyamide, obtained from the polycondensation of meta-xylylenediamine (MXD), with a $C_6$ to $C_{18}$ aliphatic dicarboxylic acid (Z),
   at least one aliphatic polyamide A obtained from the polycondensation of a unit selected from:
      a $C_6$ to $C_{12}$ lactam,
      a $C_6$ to $C_{12}$ amino acid, and
      an XY unit obtained from the polycondensation of a $C_4$ to $C_{18}$ aliphatic diamine (X), and a $C_6$ to $C_{18}$ aliphatic dicarboxylic acid (Y), and
   optionally at least one impact modifier and/or at least one additive,
   wherein the circular-section glass fibres contribute from 30 to 75% by weight with respect to the total weight of the fiber-reinforced mixture; and
   wherein after processing, the elongation at break of the fiber-reinforced mixture is increased from 10% to 30% when compared to the same mixture comprising flat-section glass fibres instead of the circular-section glass fibres.

2. The method according to claim 1, wherein the weight ratio between the at least one MXDZ polyamide and the at least one aliphatic polyamide A ranges from 0.11 to 0.83.

3. The method according to claim 1, wherein the fiber-reinforced mixture comprises:
   from 5 to 30% by weight of said at least one MXDZ polyamide,
   from 20 to 60% by weight of said at least one polyamide A,
   from 30 to 75% by weight of the circular-section glass fibres,
   from 0 to 10% of the at least one impact modifier,
   from 0 to 2% of the at least one additive,
   the sum of the proportions of each constituent of the fiber-reinforced mixture being equal to 100%.

4. The method according to claim 1, wherein said at least one MXDZ polyamide comprises MXD10.

5. The method according to claim 1, wherein the aliphatic polyamide A is obtained from the polycondensation of an XY unit, wherein Y corresponds to sebacic acid.

6. The method according to claim 1, wherein the aliphatic polyamide A is obtained from the polycondensation of an XY unit, wherein X is selected from the group consisting of $C_6$ to $C_{10}$ diamine.

7. The method according to claim 1, wherein the aliphatic polyamide A is obtained from the polycondensation of an XY unit, wherein X is selected from the group consisting of hexamethylenediamine and decanediamine.

8. The method according to claim 1, wherein the fiber-reinforced mixture includes said at least one additive, wherein said at least one additive is selected from the group consisting of fillers, dyes, stabilizers, plasticizers, surfactants, nucleating agents, pigments, brighteners, antioxidants, lubricants, flame retardants, natural waxes and mixtures thereof.

9. The method of claim 1, wherein the at least one polyamide A is selected from the group consisting of PA 1010, PA 610, PA 1012, PA 11 and PA 12 and wherein the at least one polyamide A contributes from 25 to 50% by weight towards to total weight of the fiber-reinforced mixture.

10. The method of claim 1, wherein the fiber-reinforced mixture is processed by injection or compression molding.

\* \* \* \* \*